United States Patent [19]
Bronicki

[11] 3,886,748
[45] June 3, 1975

[54] CLOSED RANKINE CYCLE POWER PLANT AND CONDENSER THEREFOR

[75] Inventor: Lucien Yehuda Bronicki, Rehovoth, Israel

[73] Assignee: Ormat Turbines (1965) Ltd., Yavne, Israel

[22] Filed: Aug. 29, 1973

[21] Appl. No.: 391,164

[30] Foreign Application Priority Data
Sept. 5, 1972 Israel...................................... 40295

[52] U.S. Cl. ..................... 60/651; 60/660; 60/690; 290/2; 165/105
[51] Int. Cl............................................. F01k 25/08
[58] Field of Search.................... 60/95 R, 651, 690; 165/105; 290/2

[56] References Cited
UNITED STATES PATENTS

| | | | |
|---|---|---|---|
| 1,821,509 | 9/1931 | Gay | 62/333 |
| 2,529,915 | 11/1950 | Chausson | 165/105 |
| 3,409,782 | 11/1968 | Bronicki | 290/2 |

*Primary Examiner*—Martin P. Schwadron
*Assistant Examiner*—H. Burks, Sr.
*Attorney, Agent, or Firm*—Donald M. Sandler; Martin P. Hoffman; James H. Ewing

[57] ABSTRACT

A closed Rankine cycle power plant operating with an organic fluid with a freezing point above ambient temperature wherein the condenser is designed for effecting the freezing of condensate on the inside without blocking vapor flow into the column. There is also provided a self-compensating condenser with a non-horizontal elongated condenser tube having a closed upper end and an open lower end associated with a header adapted to receive the vapor to be condensed. The header may be associated with a collector for the condensed liquid arriving by gravitational flow.

11 Claims, 4 Drawing Figures

Patented June 3, 1975

CLOSED RANKINE CYCLE POWER PLANT AND CONDENSER THEREFOR

This invention relates to a three-phase (i.e., solid, liquid and vapor) closed Rankine cycle power plant operating with an organic working fluid, and more particularly to a condenser for such a power plant.

The conventional closed Rankine cycle power plant operating with an organic working fluid such as disclosed in U.S. Pat. Nos. 3,393,515 and 3,409,782 utilizes two phases of the working fluid, namely the liquid and the vapor phase. A boiler converts the liquid fluid into a vapor which is conducted to a turbine where the vapors are expanded to drive a load such as an electrical generator. A condenser converts the turbine exhaust vapors back into a liquid at a lower temperature and pressure than the boiler, and means are provided for feeding the condensed liquid back into the boiler to permit the cycle to be repeated. Such a power plant can be designed to be highly reliable and relatively efficient permitting its use in powering communication equipment on either a continuous or a standby basis in remote unmanned communication relay stations which, by their inaccessibility, can be refuelled and serviced only infrequently.

A suitable working fluid for this type of power plant is ortho-dichlorobenzene (ODB) which has good thermodynamic properties, is satisfactory for lubricating the bearings of the rotating components of the power plant, and does not corrosively attack the material of the power plant at the usual boiler operating temperatures which are in the range of 200° to 250°C. Power plants utilizing ODB are satisfactory in any environment where the ambient temperature exceeds the freezing point of ODB, namely about −17.5°C.

If a conventional power plant were used in an environment where the ambient temperature is at all times below the freezing point of the working fluid (for example in some parts of Alaska and Canada), the liquid in the condenser would freeze and block the flow of working fluid thus causing automatic shut-down of the power plant. In order to operate in these environments it has been necessary to select other working fluids whose freezing points are lower than the lowest ambient temperature to which the power plant is to be subjected. So far as is known, no operation can be carried out when the ambient temperature is below the freezing point of the working fluid.

It is therefore an object of the present invention to provide a new and improved power plant, and in particular a new and improved condenser therefor, wherein the system is designed to operate at ambient temperatures below the freezing point of the working fluid.

According to the present invention, there is provided a closed Rankine cycle power plant operating with an organic fluid with a freezing point above the effective ambient temperature comprising a boiler for vaporizing the fluid from its liquid state, a turbine for expanding the vapor and driving a load such as an electric generator, a condenser for converting the turbine exhaust vapors to a liquid at a lower temperature and pressure than those in the boiler, and means for feeding the condensed liquid back into the boiler, the condenser being constructed to effect the freezing of condensate on the inside of the condenser without blocking the flow of vapors into the condenser.

The freezing or melting point of the working fluid provides the designer with a fixed temperature in the condenser which will be independent of ambient weather and power output of the system thus simplifying the design and increasing the reliability of the system. In its preferred form, the condenser comprises a non-horizontal elongated condenser tube whose lower end is open and is connected to a header adapted to receive turbine exhaust vapor and whose upper end is closed to effect the freezing of condensate on the inside of the tube to an extent dependent on the effective ambient temperature and on the power output of the system.

The inclined orientation of the condenser tube and its closed top end permits the vapor introduced into the lower bottom end to rise and condense on the walls of the tube, the condensate running down the walls by gravity to be collected and returned to the boiler. Some of the condensate will freeze and act as an insulator that increases or decreases the heat transfer characteristics of the condenser in response to changes in ambient weather conditions and the power output of the system. Moreover, the control exerted is inherent and does not involve sensors and auxiliary control systems thus permitting high reliability to be achieved, a goal that is paramount in an unmanned power station to which access is limited. For example, when the load on the turbine is constant and the weather turns colder and/or windier, the amount of the frozen condensate increases thus decreasing the ability of the condenser to reject heat and effectively reducing its size to correspond to these ambient conditions. If the weather turns warmer or less windy, the thickness of the frozen condensate decreases thus increasing the ability of the condenser to reject heat, all to the end that a substantially constant condenser temperature is maintained regardless of ambient conditions. Thus, the turbine is isolated from fluctuations in ambient temperature, a factor which prevents changes in ambient temperature from causing shock waves in the turbine nozzles and attendent catastrophic loss of efficiency and work output.

Where the output of the turbine must change due to external load requirements, and the boiler temperature is changed to a new level to accomplish this result, the condenser temperature must also change to a new level with about the same percentage change in order to maintain maximum efficiency. An approximation of the required change of condenser temperature with changes in boiler temperature is obtained by reason of the frozen condensate which quantitatively changes in the same direction as changes in the boiler temperature. Consequently, the magnitude of temperature changes in the condenser will be smaller than the magnitude of changes in the boiler temperature.

An embodiment of the invention is illustrated by way of example in the accompanying drawings, wherein.

Figure 1:
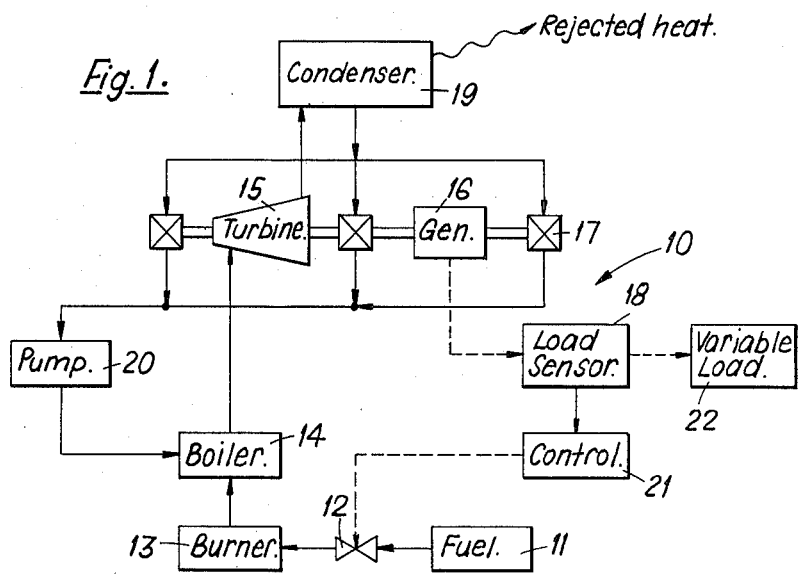
FIG. 1 is a block diagram of a conventional closed Rankine-cycle power plant.

Referring now to FIG. 1, a conventional power plant 10 operating on a closed Rankine cycle is shown in block diagram form. Fuel from tank 11 is furnished by way of control valve 12 to a burner 13 which burns the fuel and heats the high molecular weight working fluid contained within boiler 14. Vapor from the boiler is expanded in turbine 15 rotating the turbine and the generator 16 both of which are mounted on suitable bearings 17. The generator provides power to a variable load 22 through a load sensor 18.

The turbine 15 exhausts into a condenser 19 which rejects heat into the environment condensing the exhaust vapors and providing a liquid which is conducted to a feed pump 20 by way of bearings 17. The pump 20 pressurizes the liquid and feeds it into the boiler 14 completing the cycle.

When load sensor 18 detects a change in the load 22 a suitable signal is sent to control 21 which operates control valve 12 for the purpose of increasing or decreasing the amount of fuel supplied to burner 13 in accordance with the requirements of the load. For example, when the load increases, the control 21 would increase the fuel supply to the burner.

As can be seen in the schematic showing of FIG. 1, the turbine will be self-starting in that the application of heat to the boiler is the only step necessary to begin the generation of power. At shut-down, all of the liquid in the system will drain into the boiler, where it will freeze if the environmental temperature is below the freezing point of the working fluid. Note that when heat is supplied to the boiler on start-up, the initial vapour furnished to the turbine will not be sufficient to impart rotation to the turbine but will be condensed in the condenser and returned through the bearings to the boiler. Thus, when sufficient vapor is furnished to the turbine 15 for effecting its rotation, the bearings 17 will be fully lubricated.

Power plants of the type shown in FIG. 1 employing an organic working fluid are currently in use in remotely located unmanned stations where no manual control is available to compensate for fluctuations in the ability of the condenser to reject heat and so maintain the desired temperature in the turbine exhaust.

Figure 2:
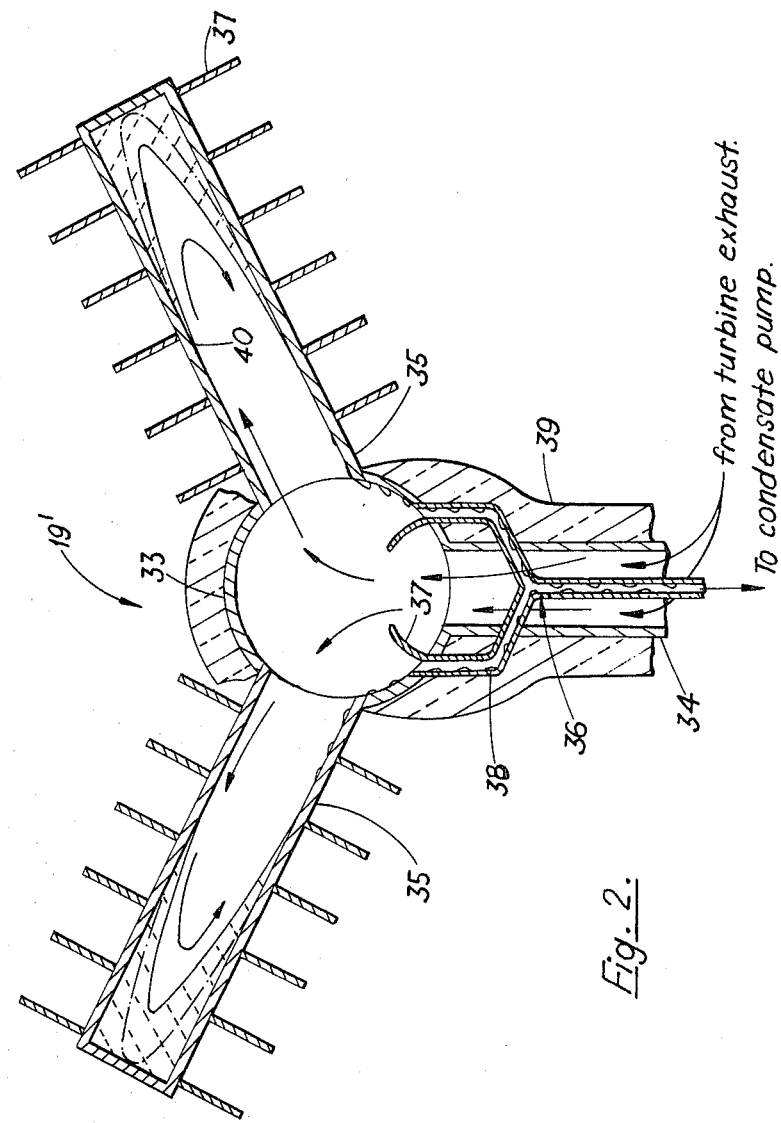
FIG. 2 is a sectional view of the condenser according to the present invention.

The self-compensating condenser 19' shown in FIG. 2 comprises a tubular header 33 disposed horizontally on one or more vertical pipes 34, a plurality of condenser tubes 35, and a collector system 36. The turbine exhaust is connected to the one or more vertical pipes 34 which convey the exhaust vapors into the tubes 35 through suitable openings in the header 33. The open lower end of each condenser tube 35 is suitably connected, as by welding, to an appropriate aperture in header 33. Each condenser tube 35 is inclined relative to the horizontal at an angle of less than 90°. The upper end of the tube is closed and the periphery of the tube is provided with a plurality of fins 37 which increase the surface area of the tube which is exposed to ambient air. To provide sufficient cooling capacity, the tubes may be arranged on the header at lengthwise spaced positions in two lengthwise rows.

The collector 36 is adjacent the bottom of the header 33 near the lower ends of the tubes 35 and serves to collect liquid condensate that gravitationally flows from the tubes 35 into the header 33. Collector 36 thus includes a lengthwise extending baffle 37 that serves to prevent the flow of liquid condensate into the vertical pipes 34. The valley formed between baffle 37 and the inside of header 33 is drained by means of a conduit 38 which permits the liquid condensate to be drained and returned to a suitable condensate sump in preparation for returning the condensate to the boiler by a suitable condensate pump. After carrying the liquid condensate from the header 33, the conduit is bent immediately back towards the center of vertical pipe 34 and passes therethrough as shown in the drawing. The conduit then continues within the vertical pipe 34 until a suitably warmed region of the power plant is encountered where the ambient weather conditions will no longer have an effect on the condensate. At this point, the conduit exits the pipe 34 and is connected to the feed pump. To further protect the condensate from freezing, the header 33 and the vertical pipe 34 are suitably insulated as shown by reference numeral 39.

In operation, vapor from the turbine exhaust passes upwardly through the vertical pipes 34 warming the conduit associated with collector 36 and then passing from header 33 into the various tubes 35. The vapor circulates within the tubes 35 until sufficient heat is rejected and the vapors are condensed, some of the condensate freezing on the inside of the tube. The extent to which freezing takes place is dependent upon both the ambient weather conditions and the turbine load. The build-up is shown on the drawing by reference numeral 40 for a condition where the ambient weather is cold and/or windy. The low temperature and windy weather on the exterior of the tube would tend to lower the exhaust temperature in a conventional condenser. In the condenser shown in FIG. 2, however, the build-up of frozen condensate provides an insulating layer which reduces the ability of the condenser to reject heat and so tends to maintain conditions substantially constant in the turbine exhaust. As the boiler temperature increases, or the weather turns warmer and/or less windy, the exhaust temperature would tend to rise. However, in the condenser shown in FIG. 2, the thickness of the frozen condensate decreases as suggested by the dashed line, thus increasing the ability of the condenser to reject heat and tending to maintain conditions substantially constant in the exhaust of the turbine.

The build-up of frozen condensate on the inner walls of the condenser tubes changes in accordance with changes in ambient weather and the load on the turbine and thus provides the self-compensation required to maintain substantially constant exhaust conditions without any manual input.

Figure 3:
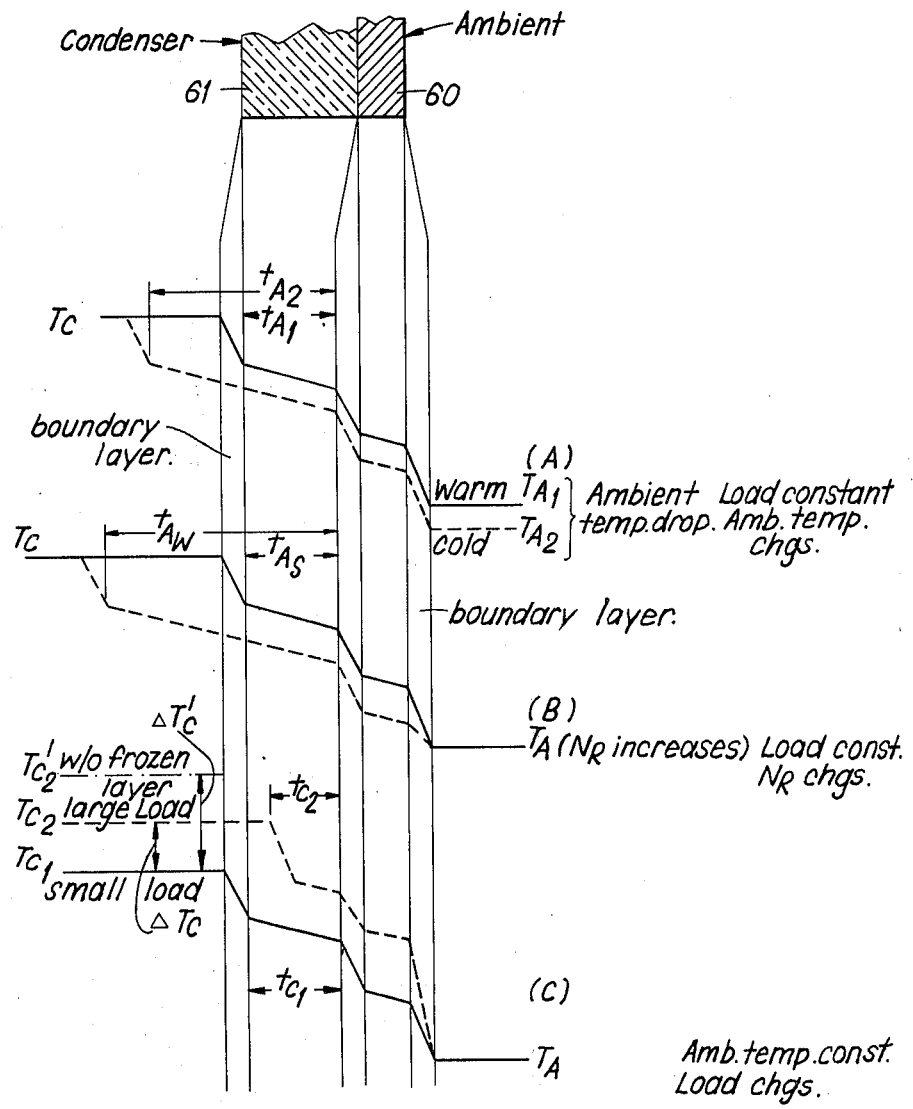
FIG. 3 is a typical plot of the variation of boiler temperature with load to illustrate the manner in which the condenser temperature must change to maintain maximum efficiency.

The manner in which the condenser provides a variable heat rejection capability is illustrated in FIG. 3 to which reference is now made. At the top of this figure is shown a section taken through the condenser showing a metal wall 60 on the inside of which is a layer 61 of frozen condensate. Curve A of FIG. 3 illustrates how, with a constant load on the turbine, the condenser temperature remains substantially constant despite changes in the ambient temperature outside the condenser. At a given ambient temperature $T_{A1}$ the thickness of the frozen condensate layer is $t_{A1}$ providing a certain temperature gradient between the temperature inside the condenser $T_o$ and the ambient temperature according to the boundary layer effect and the insulating capacity of the frozen layer. When the temperature drops to the level $T_{A2}$ the thickness of the frozen condensate layer will increase to $t_{A2}$. The result is that the condenser temperature $T_c$ will remain substantially constant.

Referring now to curve B of FIG. 3, an increase in the wind, for example, outside the condenser which would serve to increase the Reynold's number and increase the heat transfer capability of the outer walls of the condenser, will result in an increase of the thickness of the condensate layer from $t_{AS}$ to $t_{AW}$ as shown in the drawing. In the manner described above, the temperature of the condenser is substantially independent of variations in the ambient weather conditions to which the condenser is subjected.

Figure 4:
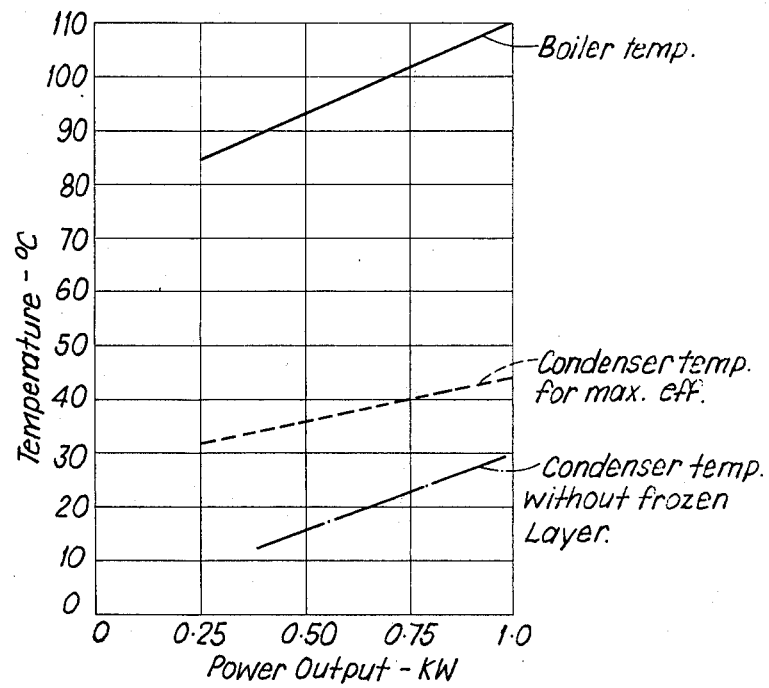
FIG. 4 shows a number of idealized plots showing how the frozen undergate automatically adjusts the heat transfer characteristics of the condenser.

To illustrate how the frozen condensate layer provides a means to control the level of the condenser temperature as a function of the boiler temperature, reference is made to FIG. 4 which illustrates the performance characteristics of a typical convergent/divergent nozzle suitable for use with the organic working fluid, ODB, which characteristics are set forth in detail in U.S. Pat. No. 3,409,782. Over the range of power shown, the turbine efficiency is substantially constant. From inspection of FIG. 4 it can be seen that the rate of change of temperature of the boiler to produce the required power is approximately twice the rate at which the condenser temperature must change in order to provide maximum efficiency. Thus, at the lowest level of power the temperature drop across the turbine is 52°C while at the maximum power the temperature drop across the turbine is 65°C.

Normally, ODB cannot be used in an environment where the ambient temperature is below −17.5°C, the freezing point of ODB. Using the present invention, however, which accommodates the freezing of the working fluid in the condenser, it is possible to use ODB; and in such case, the frozen condensate layer inside the condenser provides a means to reduce the magnitude of temperature changes in the condenser due to changes in the boiler temperature as the work output changes. This is illustrated in curves B and C of FIG. 3 where the temperature change in the condenser $\Delta T_c$ can be made less than the change in the boiler temperature by reason of a decrease in the thickness of the frozen condensate layer.

By reason of the advantages accruing from having a frozen condensate layer in the condenser, it now becomes practical by reason of the present invention to utilize as a working fluid, organic substances having a high molecular weight and a relatively high freezing point which will provide the desired frozen layer under normal operations conditions of the condenser.

I claim:

1. A closed Rankine cycle power plant comprising an organic fluid with a freezing point above the effective ambient temperature, a boiler for vaporizing the fluid from its liquid state, a turbine for expanding the vapor and driving a load such as an electric generator, a condenser exposed to a heat sink at ambient temperature for converting the turbine exhaust vapors to a liquid at a lower temperature and pressure than in the boiler, and means for feeding the condensed liquid back into the boiler, the condenser having means for effecting the freezing of condensate on the inside of the condenser without blocking the flow of vapors into the condenser.

2. A self-compensating condenser according to claim 1 wherein the header is elongated in the horizontal direction and a plurality of condenser tubes are connected to the header at lengthwise spaced positions.

3. A self-compensating condenser according to claim 2 wherein the tube is inclined at an angle to the horizontal of less than 90°C.

4. A self-compensating condenser according to claim 2 wherein the tubes are arranged on the header in two lengthwise rows.

5. A self-compensating condenser according to claim 4 wherein the header is insulated.

6. A self-compensating condenser according to claim 5 wherein the condenser tube has a plurality of fins on its exterior surface.

7. A closed Rankine cycle power plant operating with an organic working fluid comprising a boiler for vaporizing the fluid from its liquid state, a turbine for expanding the vapor and driving a load such as an electric generator, a condenser exposed to a heat sink at ambient temperature for converting the turbine exhaust vapors to a liquid at a lower temperature and pressure than in the boiler, and means for feeding the condensed liquid back into the boiler, the improvement comprising an organic working fluid with a freezing point above the effective ambient temperature of the heat sink, and means on the condenser for effecting the freezing of condensate on the inside of the condenser without blocking the flow of vapor thereinto.

8. A method for operating a closed Rankine cycle power plant having a boiler for vaporizing a working fluid, a turbine for expanding the vapor produced by the boiler and driving a load, a condenser for rejecting heat in the turbine exhaust vapors into a heat sink to convert the vapors to a liquid at a lower pressure than in the boiler, and means for feeding the condensed liquid back into the boiler, said method comprising the steps of:
  a. selecting the working fluid such that its freezing point is above the temperature of the heat sink; and
  b. arranging for condensate collecting on the inside of the condenser to freeze without blocking the flow of vapor into the condensate.

9. The method of claim 8 including the step of gravity feeding liquid that condenses on the frozen condensate into the means for feeding the condensed liquid back into the boiler.

10. A closed Rankine cycle power plant operating with an organic working fluid comprising a boiler for vaporizing the fluid from its liquid state, a turbine for expanding the vapor and driving a load such as an electric generator, a condenser exposed to a heat sink at ambient temperature for converting the turbine exhaust vapors to a liquid at a lower temperature and pressure than in the boiler, means for feeding the condensed liquid back into the boiler, and means for enabling the power plant to operate while the working fluid in the condenser exists in its solid, liquid and vapor phases.

11. A self-compensating condenser for use with a closed Rankine-cycle power plant operating with an organic fluid whose freezing point is above the ambient temperature of a sink into which the condenser rejects heat, said condenser comprising:
  a. a non-horizontal, elongated condenser tube whose lower end is open;
  b. a header connected to the lower end of the condenser tube;

c. a generally vertical exhaust pipe connected to the header for conveying exhaust gases into the header and condenser tube;

d. the upper end of the condenser tube being closed to effect freezing of condensate on the inside of the tube to an extent dependent upon the effective ambient temperature and upon the power output of the system;

e. a collector located adjacent the lower end of the tube for collecting liquid condensate that gravitationally flows on the inside of the tube; and f. a conduit connected to the collector and passing centrally in the exhaust pipe for preventing liquid in the conduit from freezing.

* * * * *

UNITED STATES PATENT AND TRADEMARK OFFICE
CERTIFICATE OF CORRECTION

PATENT NO. : 3,886,748
DATED : June 3, 1975
INVENTOR(S) : Bronicki

It is certified that error appears in the above-identified patent and that said Letters Patent are hereby corrected as shown below:

Column 5, line 67, change "1" to --11--.

Column 6, line 5, delete "C".

Column 6, line 10, change "4" to --11--.

Column 6, line 42, change "condensate" to --condenser--.

Signed and Sealed this fifteenth Day of June 1976

[SEAL]

Attest:

RUTH C. MASON
*Attesting Officer*

C. MARSHALL DANN
*Commissioner of Patents and Trademarks*